(12) United States Patent
Zhang

(10) Patent No.: US 12,193,105 B2
(45) Date of Patent: Jan. 7, 2025

(54) METHOD AND DEVICE USED FOR DISCONTINUOUS RECEPTION IN WIRELESS COMMUNICATION

(71) Applicant: BUNKER HILL TECHNOLOGIES LLC, Allen, TX (US)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 319 days.

(21) Appl. No.: 17/673,759

(22) Filed: Feb. 16, 2022

(65) Prior Publication Data

US 2022/0174779 A1 Jun. 2, 2022

Related U.S. Application Data

(63) Continuation of application No. PCT/CN2021/076158, filed on Feb. 9, 2021.

(30) Foreign Application Priority Data

Feb. 13, 2020 (CN) .......................... 202010091328.4

(51) Int. Cl.
*H04W 76/28* (2018.01)
*H04W 24/08* (2009.01)
(Continued)

(52) U.S. Cl.
CPC .......... *H04W 76/28* (2018.02); *H04W 24/08* (2013.01); *H04W 72/0446* (2013.01); *H04W 80/02* (2013.01)

(58) Field of Classification Search
CPC ............................. H04W 76/28; H04W 24/08
See application file for complete search history.

(56) References Cited

U.S. PATENT DOCUMENTS

2008/0267105 A1* 10/2008 Wang ................. H04W 56/005
370/311
2017/0230815 A1* 8/2017 Yasukawa ............ H04W 72/02
(Continued)

FOREIGN PATENT DOCUMENTS

| CA | 3051706 A1 | 2/2020 |
| CN | 107078890 A | 8/2017 |

(Continued)

OTHER PUBLICATIONS

CN202010091328.4 Notification to Grant Patent Right for Invention dated Mar. 16, 2022.
(Continued)

*Primary Examiner* — Zhiren Qin

(57) ABSTRACT

The present disclosure provides a method and device used for discontinuous reception (DRX) for wireless communications. A first node receives first information, the first information indicates a first identity (ID); determines a start time of a first timer according to the first ID; at the start time of the first timer, starts the first timer; when the first timer is running, monitors a first radio signal in each candidate slot; herein, the first ID belongs to a link-layer ID; the start time of the first timer is a start time of a first time interval. The present disclosure determines a start time of a first timer according to a first ID, which can randomize start times of user's DRX, avoiding possible system congestion and increasing transmission accuracy.

17 Claims, 6 Drawing Sheets

(51) Int. Cl.
 *H04W 72/0446* (2023.01)
 *H04W 80/02* (2009.01)

(56) References Cited

U.S. PATENT DOCUMENTS

| | | |
|---|---|---|
| 2017/0285105 A1 | 10/2017 | Uemura |
| 2018/0338281 A1 | 11/2018 | Bangolae |
| 2019/0098689 A1 | 3/2019 | Wei |
| 2019/0199503 A1 | 6/2019 | Son |
| 2019/0254104 A1 | 8/2019 | Gurumoorthy |
| 2019/0313375 A1 | 10/2019 | Loehr |
| 2019/0379518 A1 | 12/2019 | Yang |
| 2020/0045707 A1 | 2/2020 | Hwang |
| 2020/0120745 A1* | 4/2020 | Yang ............... H04W 40/24 |
| 2021/0307031 A1* | 9/2021 | Chen ............... H04W 28/02 |
| 2021/0360736 A1* | 11/2021 | Chen ............ H04W 52/0216 |
| 2023/0014303 A1* | 1/2023 | Di Girolamo ....... H04W 72/20 |
| 2023/0084593 A1* | 3/2023 | Hoang ........... H04W 52/0225 370/311 |
| 2023/0097552 A1* | 3/2023 | Freda ............ H04W 52/0216 370/329 |

FOREIGN PATENT DOCUMENTS

| | | |
|---|---|---|
| CN | 107852627 A | 3/2018 |
| EP | 3113548 A1 | 1/2017 |
| EP | 3216308 A1 | 9/2017 |
| WO | 2018064477 A1 | 4/2018 |

OTHER PUBLICATIONS

CN202010091328.4 First Search Report dated Mar. 10, 2022.
ISR received in application No. PCT/CN2021/076158 dated Jun. 4, 2021.
"ETWSreceptioninRRC_IDLEstate/Duplicatedetection"3GPPTS36.523-1V16.2.0(Sep. 2019).
"3rdGenerationPartnershipProjectTechnicalSpecificationGroupRadioAccessNetworkEvolvedUniversalTerrestrialRadioAccess(EUTRA);MediumAccessControl(MAC)protocolspecification(Release15)"3GPPTS36.321V15.5.0(Mar. 2019).
"3rdGenerationPartnershipProjectTechnicalSpecificationGroupRadioAccessNetworkEvolvedUniversalTerrestrialRadioAccess(E-UTRA);MediumAccessControl(MAC)protocolspecification(Release15)"3GPPTS36.321V15.3.0(Sep. 2018).
"3rdGenerationPartnershipProject;TechnicalSpecificationGroupCoreNetworkandTerminals;Organizationofsubscriberdata(Release14)"3GPPTS23.008V14.4.0(Dec. 2017).
"ETWSreceptioninRRC_IDLEstate/Duplicatedetection"3GPPTS36.523-1V16.3.0(Dec. 2019).

* cited by examiner

METHOD AND DEVICE USED FOR DISCONTINUOUS RECEPTION IN WIRELESS COMMUNICATION

CROSS REFERENCE TO RELATED APPLICATIONS

This application is a continuation of International Application No. PCT/CN2021/076158, filed Feb. 9, 2021, claims the priority benefit of Chinese Patent Application No. 202010091328.4, filed on Feb. 13, 2020, the full disclosure of which is incorporated herein by reference.

BACKGROUND

Technical Field

The present disclosure relates to methods and devices in wireless communication systems, and in particular to a method and a device in Sidelink wireless communications that support Discontinuous Reception.

Related Art

Discontinuous Reception (DRX) is a method commonly used in cellular communications to reduce power consumption of communication terminals and lengthen standby time. A base station manages a DRX-related timer through Downlink Control Information (DCI) or Medium Access Control (MAC) Control Element (CE), and then, controls whether a terminal performs wireless reception in a given slot or subframe.

Application scenarios of future wireless communication systems are becoming increasingly diversified, and different application scenarios have different performance demands on systems. To meet these various performance requirements, the 3rd Generation Partner Project (3GPP) Radio Access Network (RAN) #72 Plenary decided to study New Radio (NR), or what is called the Fifth Generation (5G), and later at the 3GPP RAN #75 Plenary, a Work Item (WI) was approved to standardize NR. In response to rapid growth of Vehicle-to-Everything (V2X) traffics, the 3GPP also has started standard planning and research work under the framework of NR. A new WI was initiated at the 3GPP RAN #86 Plenary for standardization of NR V2X DRX.

SUMMARY

Inventors find through researches that two resource allocation modes, mode 1 and mode 2, are supported in NR V2X, and mode 2 works in out-of-coverage scenarios or in Radio Resource Control (RRC)-Idle state or RRC-Inactive state in in-coverage scenarios, at this time, the network cannot perform parameter configuration and control on DRX-related timers. If all UEs adopt same pre-configuration parameters to determine parameters of these timers, complete synchronization in time of reception performed by the all UEs may be incurred, which is equivalent to reducing time resources of Sidelink (SL) resource pool, thus reducing radio resource utilization. Meanwhile, since the all UEs perform transmission in the reduced time resources, it may cause system congestion and further decrease transmission accuracy.

To address the above problem, the present disclosure provides a solution. It should be noted that though the present disclosure only took the NR V2X scenario for example in the statement above, it is also applicable to other scenarios confronting the same difficulty, including relay network, Device-to-Device (D2D) network, cellular networks, and scenarios supporting Half Duplex UE, where similar technical effects can be achieved. Additionally, the adoption of a unified solution for various scenarios, including but not limited to NR V2X and downlink communications, contributes to the reduction of hardcore complexity and costs. If no conflict is incurred, embodiments in the first node in the present disclosure and the characteristics of the embodiments are also applicable to any other node, and vice versa. What's more, the embodiments in the present disclosure and the characteristics in the embodiments can be arbitrarily combined if there is no conflict. Particularly, for interpretations of the terminology, nouns, functions and variants (if not specified) in the present disclosure, refer to definitions given in TS36 series, TS38 series and TS37 series of 3GPP specifications.

The present disclosure provides a method in a first node for wireless communications, comprising:

receiving first information, the first information indicating a first identity (ID); determining a start time of a first timer according to the first ID; at the start time of the first timer, starting the first timer; and when the first timer is running, monitoring a first radio signal in each candidate slot;

herein, the first ID belongs to a link-layer ID.

In one embodiment, when a slot is reserved for SL, the slot is a candidate slot.

In one embodiment, when part or all of multicarrier symbols of a slot is reserved for SL, the slot is a candidate slot.

In one embodiment, the multicarrier symbol is an Orthogonal Frequency Division Multiplexing (OFDM) symbol.

In one embodiment, the multicarrier symbol is a Single-Carrier Frequency-Division Multiple Access (SC-FDMA) symbol.

In one embodiment, the multicarrier symbol is a Filterbank Multicarrier (FBMC) symbol.

In one embodiment, when a slot is reserved for SL and is not used by the first node for transmitting a Physical Sidelink Shared Channel (PSSCH), the slot is a candidate slot.

In one embodiment, when a slot is reserved for SL and is not used by the first node for transmitting a Physical Sidelink Control Channel (PSCCH), the slot is a candidate slot.

In one embodiment, when a slot is configured as search space of the first node, the slot is a candidate slot.

In one embodiment, the first node determines a start time of the first timer according to the first ID, which can randomize start times of user's DRX, avoiding complete synchronization in time when a UE performs DRX.

Specifically, according to one aspect of the present disclosure, the above method is characterized in comprising:

the start time of the first timer being a start time of a first time interval; a remainder of an index of a first subframe in a Frame Number (FN) period divided by a first time length being the same as a remainder of the first ID divided by the first time length;

herein, the first subframe comprises the first time interval.

In one embodiment, the first subframe is related to the first ID, the first subframe comprises the first time interval, a start time of the first time interval is the start time of the first timer, the start time of the first timer is determined according to the first ID, which can randomize a start time of user's DRX, thus avoiding possible system congestion and increasing transmission accuracy.

In one embodiment, the FN period is a System Frame Number (SFN) period.

In one embodiment, the FN period is a Direct Frame Number (DFN) period.

Specifically, according to one aspect of the present disclosure, the above method is characterized in comprising:

when the first timer is running, updating the first timer in each second time interval.

Specifically, according to one aspect of the present disclosure, the above method is characterized in comprising:

receiving second information, the second information indicating a first expiration value of the first timer.

Specifically, according to one aspect of the present disclosure, the above method is characterized in comprising:

the first time length being a drx-ShortCycle, or a drx-LongCycle.

Specifically, according to one aspect of the present disclosure, the above method is characterized in comprising:

receiving third information, the third information indicating a FN and a subframe number;

herein, the FN and the subframe number are used for determining the index of the first subframe in the FN period.

In one embodiment, the FN is a SFN.

In one embodiment, the FN is a DFN.

Specifically, according to one aspect of the present disclosure, the above method is characterized in comprising:

transmitting an ID of the first node;

herein, the first radio signal is monitored on SL.

In one embodiment, the SL comprises time-frequency resources reserved for a PSCCH.

In one embodiment, the SL comprises a PSSCH scheduled by a PSCCH.

In one embodiment, the SL comprises time-frequency resources reserved for V2X transmission.

In one embodiment, the SL comprises time-frequency resources reserved for Device to Device (D2D) transmission.

Specifically, according to one aspect of the present disclosure, the above method is characterized in comprising:

receiving a first signaling;

herein, the first signaling is a MAC control element used for DRX.

The present disclosure provides a method in a second node for wireless communications, comprising:

transmitting first information, the first information comprising a first ID; the first ID being used for indicating a start time of a first timer; at the start time of the first timer, the first timer being started; and when the first timer is running, transmitting a first radio signal in a candidate slot;

herein, the first ID belongs to a link-layer ID.

Specifically, according to one aspect of the present disclosure, the above method is characterized in comprising:

the start time of the first timer being a start time of a first time interval; a remainder of an index of a first subframe in an FN period divided by a first time length being the same as a remainder of the first ID divided by the first time length;

herein, the first subframe comprises the first time interval.

Specifically, according to one aspect of the present disclosure, the above method is characterized in comprising:

when the first timer is running, the first timer being updated in each second time interval.

Specifically, according to one aspect of the present disclosure, the above method is characterized in comprising:

transmitting second information, the second information comprising a first expiration value of the first timer.

Specifically, according to one aspect of the present disclosure, the above method is characterized in comprising:

the first time length being a drx-ShortCycle, or a drx-LongCycle.

Specifically, according to one aspect of the present disclosure, the above method is characterized in comprising:

transmitting third information, the third information indicating a FN and a subframe number;

herein, the FN and the subframe number are used for indicating the index of the first subframe in the FN period.

Specifically, according to one aspect of the present disclosure, the above method is characterized in comprising:

receiving an ID of the first node;

herein, the first radio signal is transmitted on SL.

Specifically, according to one aspect of the present disclosure, the above method is characterized in comprising:

transmitting a first signaling;

herein, the first signaling is a MAC control element used for DRX.

The present disclosure provides a first node for wireless communications, comprising:

a first receiver, receiving first information, the first information indicating a first ID; determining a start time of a first timer according to the first ID; at the start time of the first timer, starting the first timer; and a second receiver, when the first timer is running, monitoring a first radio signal in each candidate slot;

herein, the first ID belongs to a link-layer ID.

The present disclosure provides a second node for wireless communications, comprising:

a second transmitter, transmitting first information, the first information comprising a first ID; the first ID is used for indicating a start time of a first timer; at the start time of the first timer, the first timer being started; and a third transmitter, when the first timer is running, transmitting a first radio signal in a candidate slot;

herein, the first ID belongs to a link-layer ID.

In one embodiment, the method in the present disclosure is advantageous in the following aspects:

The methods in the present disclosure take using user's ID to determine DRX-related timer's parameters into account, which can realize randomization of user's reception time when the network cannot perform DRX-related timer's parameter configuration to avoid complete synchronization in time of reception performed by a UE, thus reducing radio resource utilization, avoiding possible system congestion and increasing transmission accuracy.

The methods in the present disclosure can determine DRX-related timer's parameters with both transmitting user's ID and receiving user's ID, which can effectively support DRX operation in Unicast, Groupcast and Broadcast transmission to realize consistency in design, thus further simplifying design in NR V2X protocol.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
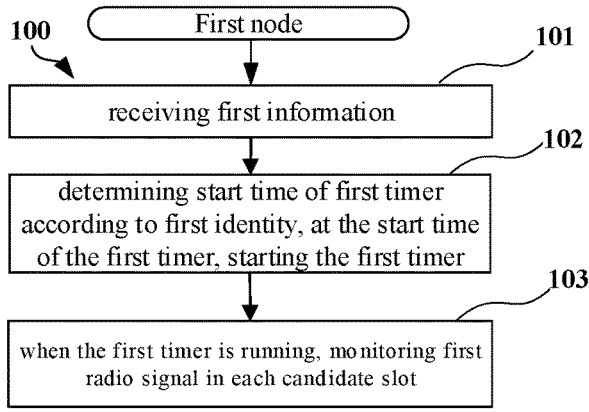
FIG. 1 illustrates a flowchart of first information, a first timer and a first radio signal according to one embodiment of the present disclosure.

Embodiment 1 illustrates a flowchart of first information, a first timer and a first radio signal according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, a first node in the present disclosure receives first information in step 101, the first information indicates a first ID, and the first ID belongs to a link-layer ID; determines a start time of a first timer according to the first ID in step 102; at the start time of the first timer, starts the first timer; when the first timer is running in step 103, monitors a first radio signal in each candidate slot;

In one embodiment, the first information is transmitted by the second node in the present disclosure to the first node.

In one embodiment, the first information is higher-layer information.

In one embodiment, the first information is transmitted internally within the first node in the present disclosure.

In one embodiment, the first information is conveyed from a higher layer of the first node in the present disclosure to a Media Access Control (MAC) layer of the first node in the present disclosure.

In one embodiment, a transmitter of the first information is ProSe feature.

In one embodiment, a transmitter of the first information is a ProSe application server.

In one embodiment, the first information is configured.

In one embodiment, the first information is pre-configured.

In one embodiment, the first information is UE-assigned.

In one embodiment, the first information is a Downlink (DL) signaling.

In one embodiment, the first information is an SL signaling.

In one embodiment, the first information is a DL RRC layer signaling.

In one embodiment, the first information is an SL RRC layer signaling.

In one embodiment, the first information comprises all or partial fields of a ProSe Direct Discovery message.

In one embodiment, the first information comprises all or partial fields of a PC5 Signaling Protocol message.

In one embodiment, the first information comprises all or partial fields of a ProSe Direct Communication message.

In one embodiment, the first information comprises all or partial Information Elements (IEs) in an RRC signaling.

In one embodiment, the first information comprises all or partial fields in an IE in an RRC signaling.

In one embodiment, the first information comprises all or partial IEs in a piece of System Information Block (SIB) information.

In one embodiment, the first information comprises all or partial fields in an IE in a piece of SIB information.

In one embodiment, the first information is Cell-Specific.

In one embodiment, the first information is a piece of zone-specific information, and the zone is determined by UE's location information.

In one embodiment, the first information is UE group-specific information.

In one embodiment, the first information is UE-specific information.

In one embodiment, the first information is transmitted through a Downlink Shared Channel (DL-SCH).

In one embodiment, the first information is transmitted through a Physical Downlink Shared Channel (PDSCH).

In one embodiment, the first information is transmitted through a Physical Downlink Control Channel (PDCCH).

In one embodiment, the first information comprises all or partial fields in a DCI signaling.

In one embodiment, the first information is transmitted through a Sidelink Shared Channel (SL-SCH).

In one embodiment, the first information is transmitted through a PSSCH.

In one embodiment, the first information is transmitted through a PSCCH.

In one embodiment, the first information comprises all or part of fields in a Sidelink Control Information (SCI) signaling.

In one embodiment, the first information is Broadcast.

In one embodiment, the first information is Unicast.

In one embodiment, the first information is Groupcast.

In one embodiment, the first information comprises an application ID, and part or all of bits of the application ID are mapped to the first ID.

In one embodiment, the first information comprises a link-layer ID, and part or all of bits of the link-layer ID are mapped to the first ID.

In one embodiment, the first information comprises a Proximity-Service User Equipment Identity (ProSe UE ID), and part or all of bits of the ProSe UE ID are mapped to the first identity.

In one embodiment, the first information comprises a Proximity-Service Group Identity (ProSe group ID), and part or all of bits in the ProSe group ID are mapped to the first ID.

In one embodiment, the first information comprises a Source Layer-2 ID, and part or all of bits of the Source Layer-2 ID are mapped to the first ID.

In one embodiment, the first information comprises a Destination Layer-2 ID, and part or all of bits of the Destination Layer-2 ID are mapped to the first ID.

In one embodiment, the first information comprises a ProSe Relay UE ID, and part or all of bits of the ProSe Relay UE ID are mapped to the first ID.

In one embodiment, the first information comprises a Proximity-Service Layer-2 Group Identity (ProSe Layer-2 Group ID), and part or all of bits of the ProSe Layer-2 Group ID are mapped to the first ID.

In one embodiment, the first ID comprises part or all of bits of a ProSe Layer-2 Group ID of a second node in the present disclosure.

In one embodiment, the first ID comprises part or all of bits of a ProSe group ID of a second node in the present disclosure.

In one embodiment, the first ID comprises part or all of bits of a ProSe UE ID of a second node in the present disclosure.

In one embodiment, the first ID comprises part or all of bits of a Source Layer-2 ID of a second node in the present disclosure.

In one embodiment, the first ID comprises part or all of bits of a ProSe Relay UE ID of a second node in the present disclosure.

In one embodiment, the first ID comprises part or all of bits of a ProSe UE ID of a first node.

In one embodiment, the first ID comprises part or all of bits of a Source Layer-2 ID of a first node.

In one embodiment, the first ID comprises 8 Least Significant Bits (LSBs) of a ProSe Layer-2 Group ID of a second node in the present disclosure.

In one embodiment, the first ID comprises 10 LSBs of a ProSe Layer-2 Group ID of a second node in the present disclosure.

In one embodiment, the first ID comprises 16 LSBs of a ProSe Layer-2 Group ID of a second node in the present disclosure.

In one embodiment, the first ID comprises 8 LSBs of a ProSe group ID of a second node in the present disclosure.

In one embodiment, the first ID comprises 10 LSBs of a ProSe group ID of a second node in the present disclosure.

In one embodiment, the first ID comprises 16 LSBs of a ProSe group ID of a second node in the present disclosure.

In one embodiment, the first ID comprises 8 LSBs of a ProSe UE ID of a second node in the present disclosure.

In one embodiment, the first ID comprises 10 LSBs of a ProSe UE ID of a second node in the present disclosure.

In one embodiment, the first ID comprises 16 LSBs of a ProSe UE ID of a second node in the present disclosure.

In one embodiment, the first ID comprises 8 LSBs of a Source Layer-2 ID of a second node in the present disclosure.

In one embodiment, the first ID comprises 10 LSBs of a Source Layer-2 ID of a second node in the present disclosure.

In one embodiment, the first ID comprises 16 LSBs of a Source Layer-2 ID of a second node in the present disclosure.

In one embodiment, the first ID comprises 8 LSBs of a ProSe Relay UE ID of a second node in the present disclosure.

In one embodiment, the first ID comprises 10 LSBs of a ProSe Relay UE ID of a second node in the present disclosure.

In one embodiment, the first ID comprises 16 LSBs of a ProSe Relay UE ID of a second node in the present disclosure.

In one embodiment, the first ID comprises 8 LSBs of a ProSe UE ID of a first node.

In one embodiment, the first ID comprises 10 LSBs of a ProSe UE ID of a first node.

In one embodiment, the first ID comprises 16 LSBs of a ProSe UE ID of a first node.

In one embodiment, the first ID comprises 8 LSBs of a Source Layer-2 ID of a first node.

In one embodiment, the first ID comprises 10 LSBs of a Source Layer-2 ID of a first node.

In one embodiment, the first ID comprises 16 LSBs of a Source Layer-2 ID of a first node.

In one embodiment, the first radio signal is monitored in each candidate slot other than a candidate slot (candidate slots) performing wireless transmission of the each candidate slot.

In one embodiment, the first radio signal is monitored in each candidate slot other than a candidate slot (candidate slots) performing SL wireless transmission of the each candidate slot.

In one embodiment, the first radio signal is monitored in each candidate slot performing wireless reception in the each candidate slot.

In one embodiment, the first radio signal is monitored in each candidate slot performing SL wireless reception in the each candidate slot.

In one embodiment, the second receiver performs monitoring in the each candidate slot.

In one embodiment, the first radio signal is a PDCCH.

In one embodiment, the first radio signal is a PSCCH.

In one embodiment, the first radio signal is a PSSCH.

In one embodiment, a transmitter of the first radio signal is a transmitter other than the first node.

In one embodiment, a transmitter of the first radio signal is the second node in the present disclosure.

In one embodiment, the first radio signal is transmitted via an air interface.

In one embodiment, the first radio signal is transmitted via a radio interface.

In one embodiment, the first radio signal is transmitted via a PC5 interface.

In one embodiment, the first radio signal is transmitted via SL.

In one embodiment, all or part of a Transport Block (TB) is used for generating the first radio signal.

In one embodiment, all or part of a TB and a reference signal are used together for generating the first radio signal.

In one embodiment, all or partial bits in a TB acquires the first radio signal sequentially through CRC Calculation, Channel Coding, Rate matching, Scrambling, Modulation, Layer Mapping, Antenna Port Mapping, Mapping to Virtual Resource Blocks, Mapping from Virtual to Physical Resource Blocks, OFDM Baseband Signal Generation, Modulation and Upconversion.

In one embodiment, all or partial bits in payload of a piece of SCI acquire the first radio signal sequentially through CRC Calculation, Channel Coding, Rate Matching, Scrambling, Modulation, Mapping to Physical Resources, OFDM Baseband Signal Generation, and Modulation and Upconversion.

Embodiment 2

Figure 2:
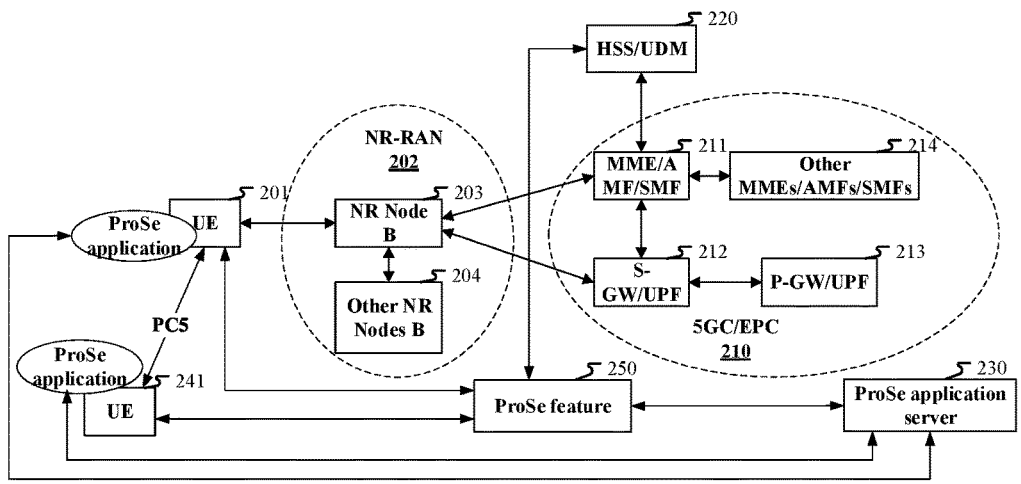
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. In NTN network, the gNB 203 may be a satellite, an aircraft or a territorial base station relayed through a satellite. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, vehicle equipment, On-board communication unit, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet. The Internet Service comprises IP services corresponding to operators, specifically including Internet, Intranet, IP Multimedia Subsystem (IMS) and Packet Switching Streaming Services (PSS). The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 corresponds to the first node in the present disclosure.

In one embodiment, the UE 201 supports SL communications.

In one embodiment, the UE 201 supports a PC5 interface.

In one embodiment, the UE 201 supports Internet of Vehicles.

In one embodiment, the UE 201 supports V2X traffic.

In one embodiment, the UE 201 corresponds to the second node in the present disclosure.

In one embodiment, the gNB 203 corresponds to the second node in the present disclosure.

In one embodiment, the gNB 203 supports Internet of Vehicles.

In one embodiment, the gNB 203 supports V2X traffic.

In one embodiment, the gNB 203 is a Marco Cell base station.

In one embodiment, the gNB203 is a Micro Cell base station.

In one embodiment, the gNB 203 is a Pico Cell base station.

In one embodiment, the gNB203 is a Femtocell.

In one embodiment, the gNB203 is a base station supporting large delay difference.

In one embodiment, the gNB203 is a flight platform.

In one embodiment, the gNB203 is satellite equipment.

In one embodiment, a wireless link between the UE 201 to gNB 203 is Uplink.

In one embodiment, a wireless link between gNB 203 to UE 201 is Downlink.

In one embodiment, a wireless link between the UE 201 and the UE 241 corresponds to SL in the present disclosure.

In one embodiment, the ProSe feature 250 is respectively connected with the UE 201 and the UE 241 via a PC3 Reference Point.

In one embodiment, the ProSe feature 250 is connected with the ProSe application server 230 via a PC2 Reference Point.

In one embodiment, the ProSe application server 230 is respectively connected with the ProSe application of the UE 201 and the ProSe application of the UE 241 via a PC1 Reference Point.

In one embodiment, the UE 201 supports DRX.

In one embodiment, the UE 241 supports DRX.

Embodiment 3

Figure 3:
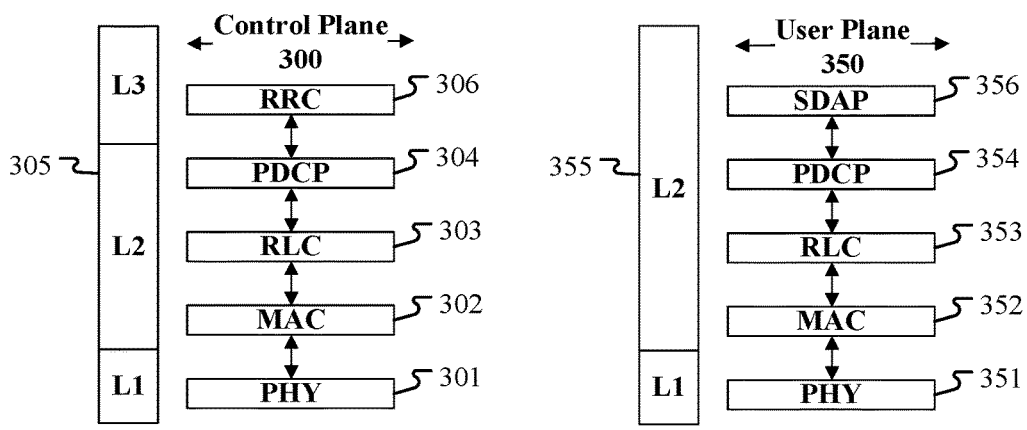
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or On-Board Communication Unit) and a second node (gNB, UE or RSU in V2X, vehicle equipment or On-Board Communication Unit), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a MAC sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel. The MAC sublayer 302 is also responsible for allocating between first-type communication nodes various radio resources (e.g., resource block) in a cell. The MAC sublayer 302 is also in charge of HARQ operation. In the control plane 300, the RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the third information in the present disclosure is generated by the RRC 306.

In one embodiment, the third information in the present disclosure is generated by the MAC 302 or the MAC 352.

In one embodiment, the third information in the present disclosure is generated by the PHY 301 or the PHY 351.

In one embodiment, the first radio signal in the present disclosure is generated by the RRC 306.

In one embodiment, the first radio signal in the present disclosure is generated by the MAC 302 or the MAC 352.

In one embodiment, the first radio signal in the present disclosure is generated by the PHY 301 or the PHY 351.

In one embodiment, the L2 layer 305 or 355 belongs to a higher layer.

In one embodiment, the RRC sublayer 306 in the L3 layer belongs to a higher layer.

Embodiment 4

Figure 4:
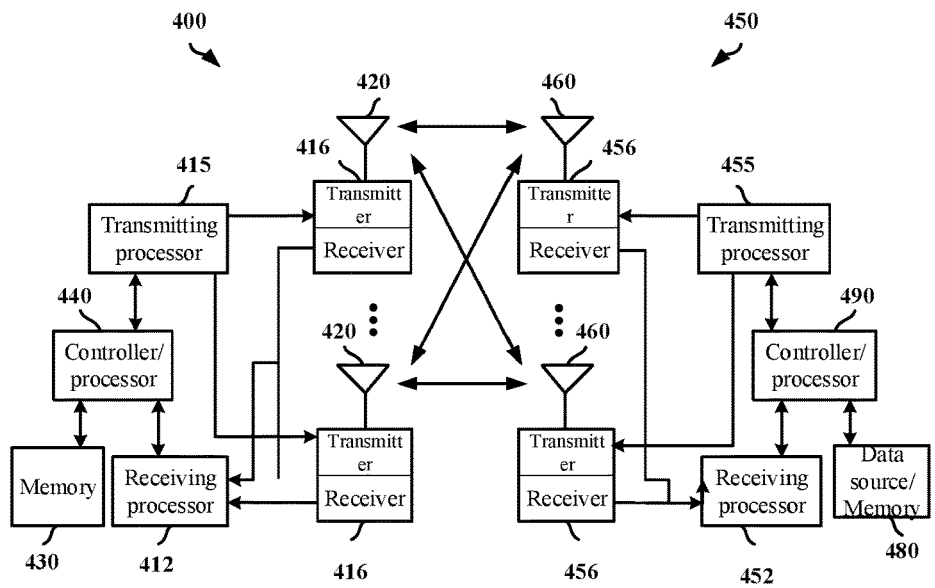
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) may comprise a controller/processor 490, a receiving processor 452, a transmitting processor 455, a transmitter/receiver 456 and a data source/memory 480, wherein the transmitter/receiver 456 comprises an antenna 460.

The second node (400) may comprise a controller/processor 440, a receiving processor 412, a transmitting processor 415, a transmitter/receiver 416, and a memory 430, wherein the transmitter/receiver 416 comprises an antenna 420.

In a transmission from the second node 400 to the first node 450, a higher layer packet, such as high-layer information comprised in first information in the present disclosure, is provided to the controller/processor 440. The controller/processor 440 implements the functionality of the L2 layer and the higher layer. In a transmission from the second node 400 to the first node 450, the controller/processor 440 provides header compression, encryption, packet segmentation and reordering, and multiplexing between a logical channel and a transport channel, and radio resource allocation of the first node 450 based on various priorities. The controller/processor 440 is also in charge of HARQ operation, retransmission of a lost packet, and a signaling to the first node 450. The transmitter processor 415 implements various signal processing functions of the L1 layer (that is, PHY), including coding, interleaving, scrambling, modulation, power control/allocation, precoding and generation of physical layer control signaling. Generation of physical layer signals of the first information in the present disclosure is performed in the transmitting processor 415. Modulated signals are divided into parallel streams and each stream is mapped onto corresponding multicarrier subcarriers and/or multicarrier symbols, which are then mapped from the transmitting processor 415 to the antenna 420 via the transmitter 416 to be transmitted in the form of RF signals. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving processing functions include reception of physical layer signals of the first information in the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second node 410 on a physical channel, and the data or control signals are later provided to the controller/processor 490. The controller/processor 490 implements the functionality of the L2 layer and the higher layer, the controller/processor 490 interprets the first information of the present disclosure. The controller/processor can be connected to a memory 480 that stores program code and data. The data source/memory 480 may be called a computer readable medium.

In a transmission from the first node 450 to the second node 400, the data source/memory 480 provides higher-layer data to the controller/processor 490. The data source/memory 480 represents all protocol layers of the L2 layer and above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the second node 410. The controller/processor 490 is also in charge of HARQ operation, a retransmission of a lost packet and a signaling to the second node 410. The transmitting processor 455 performs various signal processing functions on the layer L1 (i.e., the physical layer). The signal transmitting processing function comprises performing coding and interleaving so as to ensure a Forward Error Correction (FEC) at the UE 450 side and performing modulation to baseband signals according to each modulation scheme (i.e., BPSK, QPSK, M-PSK, and M-QAM, etc.). Modulated signals are divided into parallel streams and each stream is mapped onto corresponding multicarrier subcarriers and/or multicarrier symbols, which are then mapped from the transmitting processor 415 to the antenna 420 via the transmitter 416 to be transmitted in the form of RF signals. The receiver 416 receives a radio-frequency signal via its corresponding antenna 420, and each receiver 416 recovers baseband information modulated to a radio-frequency carrier, and supplies the baseband information to the receiving processor 412. The receiving processor 412 performs various signal receiving processing functions of the L1 layer. The signal receiving processing functions include acquisition of multicarrier symbol streams, demodulation of multicarrier symbols in multicarrier symbol streams based on each modulation scheme (e.g., BPSK, QPSK), and then decoding and de-interleaving of the demodulated symbols so as to recover data or control signals transmitted by the first node 450 on a physical channel. The data and the control signal are then provided to the controller/processor 440. The controller/processor 440 implements the functionality of the L2 layer. The controller/processor 440 can be connected to a memory 430 that stores program code and data. The memory 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives first information in step 101, the first information indicates a first ID; determines a start time of a first timer according to the first ID in step 102; at the start time of the first timer, starts the first timer; when the first timer is running in step 103, monitors a first radio signal in each candidate slot; herein, the first ID belongs to a link-layer ID.

In one embodiment, the first node 450 comprises a memory that stores a computer readable instruction program. The computer readable instruction program generates an action when executed by at least one processor. The action includes: receiving first information in step 101, the first information indicating a first ID; determining a start time of a first timer according to the first ID in step 102; at the start time of the first timer, starting the first timer; when the first timer is running in step 103, monitoring a first radio signal in each candidate slot; herein, the first ID belongs to a link-layer ID.

In one embodiment, the second node 400 comprises at least one processor and at least one memory. The at least one memory comprises computer program codes; the at least one memory and the computer program codes are configured to be used in collaboration with the at least one processor. The second node 400 at least: transmits first information, the first information comprises a first ID; the first ID is used for indicating a start time of a first timer; at the start time of the first timer, starts the first timer; when the first timer is running, transmits a first radio signal in a candidate slot; herein, the first ID belongs to a link-layer ID.

In one embodiment, the second node 400 comprises a memory that stores a computer readable instruction program. The computer readable instruction program generates an action when executed by at least one processor. The action includes: transmitting first information, the first information comprising a first ID; the first ID is used for indicating a start time of a first timer; at the start time of the first timer, the first timer being started; and when the first timer is running, transmitting a first radio signal in a candidate slot; herein, the first ID belongs to a link-layer ID.

In one embodiment, the first node 450 is a UE.

In one embodiment, the first node 450 is a UE supporting V2X.

In one embodiment, the first node 450 is a UE supporting D2D.

In one embodiment, the first node 450 is vehicle-mounted equipment.

In one embodiment, the first node 450 is an RSU.

In one embodiment, the second node 400 is a base station (gNB/eNB).

In one embodiment, the second node 400 is a base station supporting V2X.

In one embodiment, the second node 400 is a UE.

In one embodiment, the second node 400 is a UE supporting V2X.

In one embodiment, the first node 400 is a UE supporting D2D.

In one embodiment, the second node 400 is vehicle-mounted equipment.

In one embodiment, the second node 400 is an RSU.

In one embodiment, the receiver 456 (including the antenna 460), the receiving processor 452 and the controller/processor 490 are used for receiving the first information, the second information, the third information and the first radio signal in the present disclosure.

In one embodiment, the transmitter 416 (including the antenna 420), the transmitting processor 415 and the controller/processor 440 are used for transmitting the first information, the second information, the third information and the first radio signal in the present disclosure.

In one embodiment, the transmitter 456 (including the antenna 460), the transmitting processor 455 and the controller/processor 490 are used for transmitting an ID of the first node.

In one embodiment, the receiver 416 (including the antenna 420), the receiving processor 412 and the controller/processor 440 are used for receiving an ID of the first node in the present disclosure.

Embodiment 5

Figure 5:
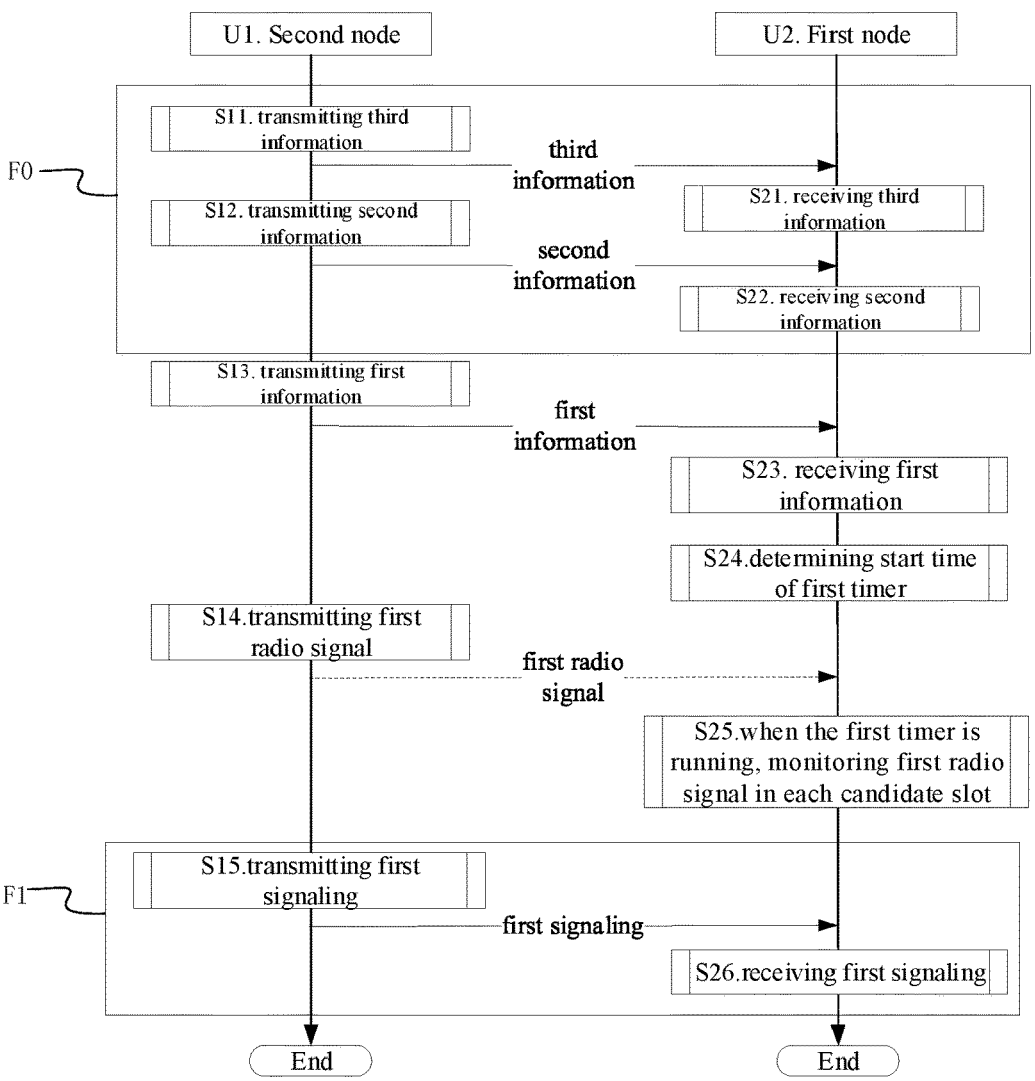
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a second node U1 and a first node U2 are in communications via SL. It is particularly underlined that the order illustrated in the embodiment does not put constraints over sequences of signal transmissions and implementations. In FIG. 5, steps respectively marked by the box F0 and the box F1 are optional.

The second node U1 transmits third information in step S11, transmits second information in step S12, transmits first information in step S13, transmits a first radio signal in step S14, and transmits a first signaling in step S15.

The first node U2 receives third information in step S21, receives second information in step S22, receives first information in step S23, and determines a start time of a first timer according to a first ID indicated by the first information in step S24; when the first timer is running in step S25, monitors a first radio signal in each candidate slot; and receives a first signaling in step S26.

In Embodiment 5, first information is received, the first information indicating a first ID; a start time of a first timer is determined according to the first ID; at the start time of the first timer, the first timer is started; when the first timer is running, a first radio signal is monitored in each candidate slot; herein, the first ID belongs to a link-layer ID; the start time of the first timer is a start time of a first time interval; a remainder of an index of a first subframe in an FN period divided by a first time length is the same as a remainder of the first ID divided by the first time length; herein, the first subframe comprises the first time interval; when the first timer is running, the first timer is updated in each second time interval; second information is received, the second information indicates a first expiration value of the first timer; the first time length is a drx-ShortCycle, or a drx-LongCycle; third information is received, the third information indicates a FN and a subframe number; herein, the FN and the subframe number are used for determining the index of the first subframe in the FN period; the first radio signal is monitored on SL; a first signaling is received; herein, the first signaling is a MAC control element used for DRX.

In one embodiment, the first node U2 and the second node U1 are respectively a UE.

In one embodiment, the first node U2 receives the first information transmitted by the second node U1, the first information comprises an ID of the second node; and the first ID is generated according to the ID of the second node U1.

In one embodiment, an ID of the second node is generated by a ProSe feature.

In one embodiment, an ID of the second node is generated by a ProSe application server.

In one embodiment, an ID of the second node is transmitted by the second node U1 to the first node U2 through a ProSe feature.

In one embodiment, the MAC layer of the first node U2 generates the first ID according to a received ID of the second node.

In one embodiment, the first node receives the first information transmitted by the second node, and the first information comprises the first node.

In one embodiment, the first ID is generated by a MAC layer of the second node U1.

In one subembodiment of the above embodiment, the first ID is generated by a MAC layer of the second node U1 according to an application ID conveyed from a ProSe application of the second node U2.

In one embodiment, the first ID is transmitted by a MAC layer of the second node U1 to a MAC layer of the first node U2.

In one embodiment, the first ID is transmitted by an RRC layer of the second node U1 to an RRC layer of the first node U2.

In one embodiment, the first time interval comprises a subframe.

In one embodiment, the first time interval comprises a slot, and a length of the slot is related to a frequency-domain Subcarrier Spacing (SCS).

In one embodiment, the first time interval comprises the candidate slot, and a length of the candidate slot is related to a frequency-domain SCS.

In one embodiment, the first time interval comprises 14 multicarrier symbols.

In one embodiment, the first time interval comprises 12 multicarrier symbols.

In one embodiment, the first time interval comprises 1 multicarrier symbol.

In one embodiment, the first time interval is a slot in the first subframe.

In one embodiment, the first time interval is a multicarrier symbol in the first subframe.

In one embodiment, the first time interval is a multicarrier symbol in a slot in the first subframe.

In one embodiment, the first subframe comprises the candidate slot.

In one embodiment, the first subframe comprises a slot other than the candidate slot.

In one embodiment, the first subframe does not comprise a slot other than the candidate slot.

In one embodiment, the first subframe comprises multiple consecutive the candidate slots.

In one embodiment, multiple the candidate slots comprised in the first subframe can be inconsecutive in time.

In one embodiment, the second time interval comprises a subframe.

In one embodiment, the second time interval comprises a slot, and a length of the slot is related to a frequency-domain SCS.

In one embodiment, the second time interval comprises the candidate slot, and a length of the candidate slot is related to a frequency-domain SCS.

In one embodiment, the second time interval comprises 14 multicarrier symbols.

In one embodiment, the second time interval comprises 12 multicarrier symbols.

In one embodiment, the second time interval comprises 1 multicarrier symbols.

In one embodiment, the second time interval is $\frac{1}{32}$ ms.

In one embodiment, the second information is transmitted from the second node to the first node.

In one embodiment, the second information is pre-configured.

In one embodiment, the second information is higher-layer information.

In one embodiment, the second information is transmitted internally within the first node in the present disclosure.

In one embodiment, the second information is conveyed from a higher layer of the first node in the present disclosure to a MAC layer of the first node in the present disclosure.

In one embodiment, the second information is a DL signaling.

In one embodiment, the second information is an SL signaling.

In one embodiment, the second information is a DL RRC layer signaling.

In one embodiment, the second information is an SL RRC layer signaling.

In one embodiment, the second information comprises all or partial IEs in an RRC signaling.

In one embodiment, the second information comprises all or partial fields in IE in an RRC signaling.

In one embodiment, the second information comprises all or partial IEs in a piece of SIB information.

In one embodiment, the second information comprises all or partial fields in an IE in a piece of SIB information.

In one embodiment, the second information comprises all or part of Master Information Block (MIB) information.

In one embodiment, the second information is a piece of zone-specific information, and the zone is determined by UE's location information.

In one embodiment, the second information is UE group-specific information.

In one embodiment, the second information is UE-specific information.

In one embodiment, the second information is Broadcast.

In one embodiment, the second information is Groupcast.

In one embodiment, the second information is Unicast.

In one embodiment, a drx-StartOffset is randomly generated at a higher layer, and the drx-StartOffset is indicated by the second information.

In one embodiment, a drx-SlotOffset is randomly generated at a higher layer, and the drx-SlotOffset is indicated by the second information.

In one embodiment, a drx-StartOffset is pre-configured, and the drx-StartOffset is configured at a MAC layer.

In one embodiment, a drx-SlotOffset is pre-configured, and the drx-SlotOffset is configured at a MAC layer.

In one embodiment, the FN is comprised in third information, the value of the FN ranges from 0 to 1023, the FN is increased by 1 at a 10-subframe-interval, and after the value reaches 1023, the FN is recounted from 0.

In one embodiment, a subframe number is acquired by a subframe where the third information is received, the subframe number is an index of the subframe in the FN period, the subframe number ranges from 0 to 9 and is increased by 1 at a 1 ms-interval, and the subframe number recounts from 0 after reaching 9.

In one embodiment, the third information comprises a synchronization signal and system information.

In one embodiment, the third information is transmitted from the second node to the first node.

In one embodiment, the third information is a DL signaling.

In one embodiment, the third information is an SL signaling.

In one embodiment, the third information is a DL RRC layer signaling.

In one embodiment, the third information is an SL RRC layer signaling.

In one embodiment, the third information comprises all or partial IEs in an RRC signaling.

In one embodiment, the third information comprises all or partial fields of an IE in an RRC signaling.

In one embodiment, the third information comprises all or partial IEs in a piece of SIB information.

In one embodiment, the third information comprises all or partial fields in an IE in a piece of SIB information.

In one embodiment, the third information comprises all or partial a piece of MIB information.

In one embodiment, the third information is a piece of zone-specific information, and the zone is determined by UE's location information.

In one embodiment, the third information is UE group-specific information.

In one embodiment, the third information is UE-specific information.

In one embodiment, the third information is Broadcast.

In one embodiment, when the discontinuous reception is configured as drx-ShortCycle, the first time length is drx-ShortCycle Q2, Q2 being a positive integer, and the second information indicates the Q2.

In one embodiment, when the discontinuous reception is configured as drx-LongCycle, the first time length is drx-LongCycle Q3, Q3 being a positive integer, and the second information indicates the Q3.

In one embodiment, the first timer interval is a first slot after the drx-SlotOffset-th slot in the first subframe.

In one embodiment, the first timer interval is a first multicarrier symbol reserved for SL in a first slot after the drx-SlotOffset-th slot in the first subframe.

In one embodiment, the phrase of a remainder of an index of a first subframe in an FN period divided by a first time length is the same as a remainder of the first ID divided by the first time length includes: when the discontinuous reception of the drx-ShortCycle is used, the first subframe's index in an FN period satisfies the formula of [(FN×10)+subframe number] modulo Q2=ID modulo Q2, wherein the ID is the first ID, and the modulo is the modulo operation.

In one embodiment, the phrase of a remainder of an index of a first subframe in an FN period divided by a first time length is the same as a remainder of the first ID divided by the first time length includes: when the discontinuous reception of the drx-LongCycle is used, the first subframe's index in an FN period satisfies the formula of [(FN×10)+subframe number] modulo Q3=ID modulo Q3, wherein the ID is the first ID, and the modulo is the modulo operation.

In one embodiment, the phrase of a remainder of an index of a first subframe in an FN period divided by a first time length is the same as a remainder of the first ID divided by the first time length includes: a remainder of a sum of the first subframe's index in an FN period and a remainder of the first ID divided by 10 then divided by a first time length is the same as a remainder of a drx-StartOffset divided by the first time length.

In one embodiment, when the discontinuous reception of the drx-ShortCycle is used, the first subframe's index in an FN period satisfies the formula of [(FN×10)+subframe number+(ID modulo 10)] modulo Q2=(drx-StartOffset) modulo Q2, wherein the ID is the first ID, and the modulo is the modulo operation.

In one embodiment, when the discontinuous reception of the drx-LongCycle is used, the first subframe's index in an FN period satisfies the formula of [(FN×10)+subframe number+(ID modulo 10)] modulo Q2=(drx-StartOffset) modulo Q3, wherein the ID is the first ID, and the modulo is the modulo operation.

In one embodiment, the phrase of a remainder of an index of a first subframe in an FN period divided by a first time length is the same as a remainder of the first ID divided by the first time length includes: a remainder of a sum of an index of a first subframe in an FN period and a remainder of the first ID divided by 10 divided by the first time length is the same as a drx-StartOffset.

In one embodiment, when the discontinuous reception of the drx-LongCycle is used, the first subframe's index in an FN period satisfies the formula of [(FN×10)+subframe number+(ID modulo 10)] modulo Q2=drx-StartOffset, wherein the ID is the first ID, and the modulo is the modulo operation.

In one embodiment, the first time interval is a first slot after a slot determined by [ID modulo Q4] in the first subframe, wherein Q4 is a number of slots per subframe, the number of slots per subframe is related to a frequency-domain SCS, the ID is the first ID, and the modulo is modulo operation.

In one embodiment, the first time interval is a first multicarrier symbol reserved for SL in a first slot after a slot determined by [ID modulo Q4] in the first subframe, wherein Q4 is a number of slots per subframe, the number of slots per subframe is related to a frequency-domain SCS, the ID is the first ID, and the modulo is modulo operation.

In one embodiment, the phrase of a remainder of an index of a first subframe in an FN period divided by a first time length is the same as a remainder of the first ID divided by the first time length includes: a remainder of the first subframe's index in an FN period divided by the first time length is the same as a remainder of a drx-StartOffset divided by the first time length.

In one embodiment, when the discontinuous reception of the drx-ShortCycle is used, the first subframe's index in an FN period satisfies the formula of [(FN×10)+subframe number] modulo Q2=(drx-StartOffset) modulo Q2, and the modulo is the modulo operation.

In one embodiment, when the discontinuous reception of the drx-LongCycle is used, the first subframe's index in an FN period satisfies the formula of [(FN×10)+subframe number] modulo Q3=(drx-StartOffset) modulo Q3, and the modulo is the modulo operation.

In one embodiment, the phrase of a remainder of an index of a first subframe in an FN period divided by a first time length is the same as a remainder of the first ID divided by the first time length includes: a remainder of the first subframe's index in an FN period divided by the first time length is the same as a drx-StartOffset.

In one embodiment, when the discontinuous reception of the drx-LongCycle is used, the first subframe's index in an FN period satisfies the formula of [(FN×10)+subframe number] modulo Q3=drx-StartOffset, and the modulo is the modulo operation.

In one embodiment, the phrase of monitoring a first radio signal includes judging whether the first radio signal exists according to coherent detection of a feature sequence.

In one embodiment, the phrase of monitoring a first radio signal includes judging whether the first radio signal exists according to received energy.

In one embodiment, the phrase of monitoring a first radio signal includes judging whether the first radio signal is received according to CRC.

In one embodiment, the phrase of monitoring a first radio signal includes a Blind Decoding operation performed on SCI.

In one embodiment, the phrase of monitoring a first radio signal includes Blinding Decoding performed on SCI and decoding performed on the PSSCH scheduled by the PSSCH.

In one embodiment, the first signaling is a DRX Command MAC CE.

In one embodiment, the first signaling is a Long DRX Command MAC CE.

Embodiment 6

Figure 6:
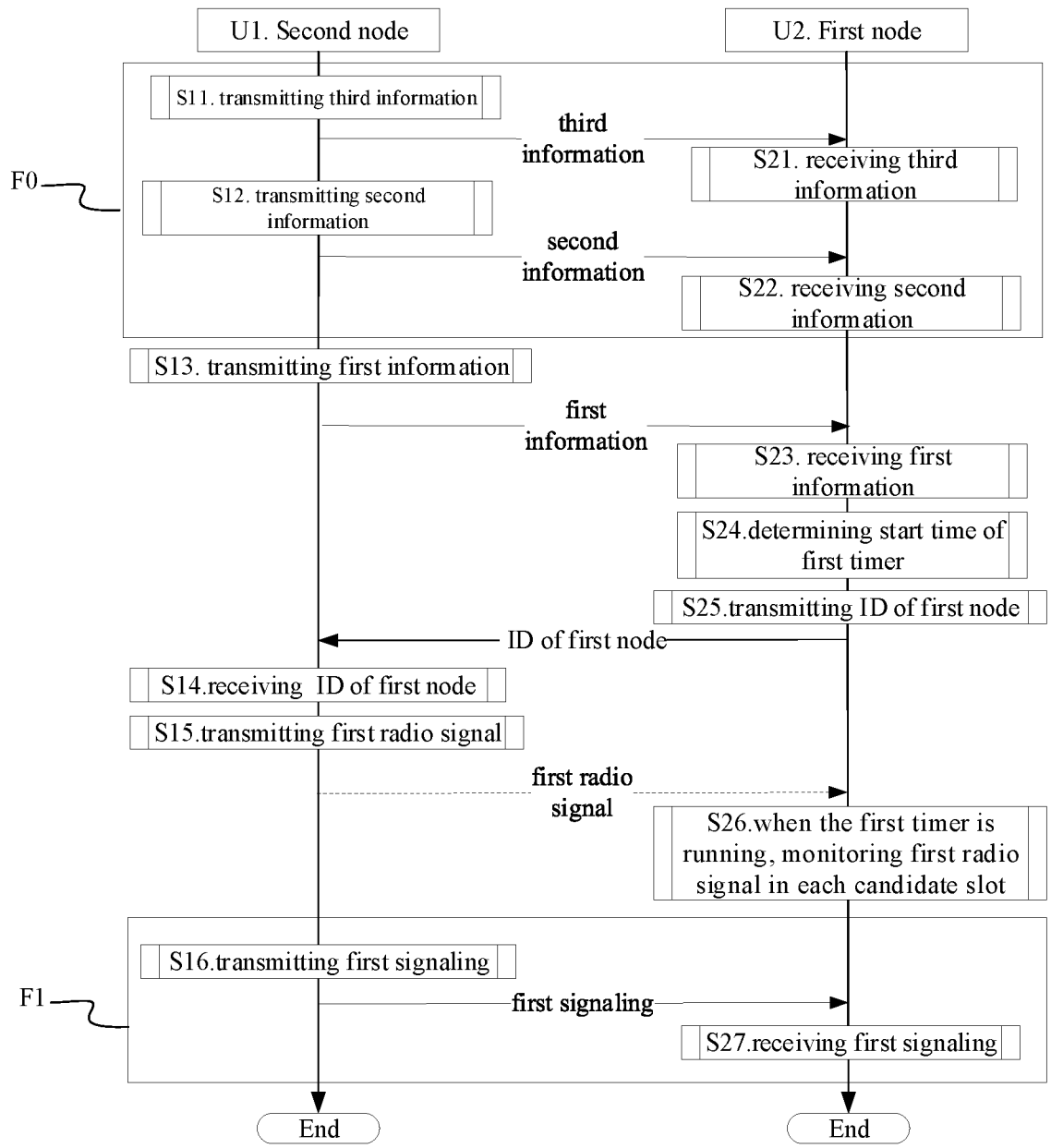
FIG. 6 illustrates another flowchart of radio signal transmission according to one embodiment of the present disclosure.

Embodiment 6 illustrates another flowchart of radio signal transmission according to one embodiment of the present disclosure, as shown in FIG. 6. In FIG. 6, a second node U1 and a first node U2 are in communications via SL. it is particularly underlined that the order illustrated in the embodiment does not put constraints over sequences of signal transmissions and implementations. In FIG. 6, steps respectively marked by the box F0 and the box F1 are optional.

The second node U1 transmits third information in step S11, transmits second information in step S12, transmits first information in step S13, receives an ID of the first node in step S14, transmits a first radio signal in step S15, and transmits a first signaling in step S16.

The first node U2 receives third information in step S21, receives second information in step S22, receives first information in step S23, and determines a start time of a first timer according to a first ID indicated by the first information in step S24; transmits an ID of the first node in step S25; when the first timer is running in step S26, monitors a first radio signal in each candidate slot, and receives a first signaling in step S27.

In Embodiment 6, first information is received, the first information indicating a first ID; a start time of a first timer is determined according to the first ID; at the start time of the first timer, the first timer is started; when the first timer is running, a first radio signal is monitored in each candidate slot; herein, the first ID belongs to a link-layer ID; the start time of the first timer is a start time of a first time interval; a remainder of an index of a first subframe in an FN period divided by a first time length is the same as a remainder of the first ID divided by the first time length; herein, the first subframe comprises the first time interval; when the first timer is running, the first timer is updated in each second time interval; second information is received, and the second information indicates a first expiration value of the first timer; the first time length is a drx-ShortCycle, or a drx-LongCycle; third information is received, and the third information indicates the FN and a subframe number; herein, the FN and the subframe number are used for determining the index of the first subframe in the FN period; an ID of the first node is transmitted; the first radio signal is monitored on SL; a first signaling received; herein, the first signaling is a MAC control element used for DRX.

In one embodiment, an ID of the first node is transmitted by the first node U2 to the second node U1 through ProSe feature.

In one embodiment, an ID of the first node is transmitted from a MAC layer of the first node U2 to a MAC layer of the second node U1.

In one embodiment, an ID of the first node is transmitted from an RRC layer of the first node U2 to an RRC layer of the second node U1.

In one embodiment, an ID of the first node is transmitted by the first node U2 to the second node U1 via a PC5 interface.

In one embodiment, an ID of the first node comprises part or all of bits of a link-layer ID of the first node.

In one subembodiment of the above embodiment, the link-layer ID is generated by a ProSe feature.

In one embodiment, an ID of the first node comprises part or all of bits of a ProSe UE ID of the first node.

In one embodiment, an ID of the first node comprises part or all of bits of a Source Layer-2 ID of the first node.

In one embodiment, an ID of the first node comprises 8 LSBs of a ProSe UE ID of the first node.

In one embodiment, an ID of the first node comprises 10 LSBs of a ProSe UE ID of the first node.

In one embodiment, an ID of the first node comprises 16 LSBs of a ProSe UE ID of the first node.

In one embodiment, an ID of the node comprises 8 LSBs of a Source Layer-2 ID of the first node.

In one embodiment, an ID of the node comprises 10 LSBs of a Source Layer-2 ID of the first node.

In one embodiment, an ID of the node comprises 16 LSBs of a Source Layer-2 ID of the first node.

In one embodiment, an ID of the first node is used for indicating a start time at which a transmission operation can be performed on the first node.

In one embodiment, the first ID is generated at a MAC layer of the first node U2.

Embodiment 7

Figure 7:
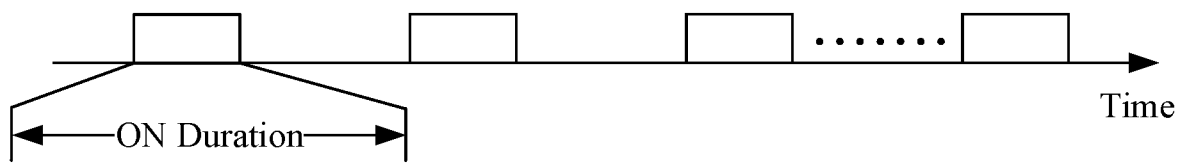
FIG. 7 illustrates a schematic diagram of an on duration according to one embodiment of the present disclosure.

Embodiment 7 illustrates a schematic diagram of an on duration according to one embodiment of the present disclosure, as shown in FIG. 7. In FIG. 7, candidate slots comprised in the on duration are consecutive in time domain.

In one embodiment, the on duration comprises a positive integer number of subframe(s), and the subframe(s) is(are) reserved for SL.

In one embodiment, the on duration comprises a positive integer number of slot(s), and the slot(s) is(are) reserved for SL.

In one embodiment, the slots comprised in the on duration are consecutive in time domain.

In one embodiment, a slot comprises 14 multicarrier symbols.

In one embodiment, a slot comprises 12 multicarrier symbols.

In one embodiment, a slot comprises a SCI search space.

In one embodiment, in the on duration, the first node is in a continuous reception state.

In one embodiment, in the on duration, the first node monitors the first radio signal in the present disclosure on SL.

Embodiment 8

Figure 8:
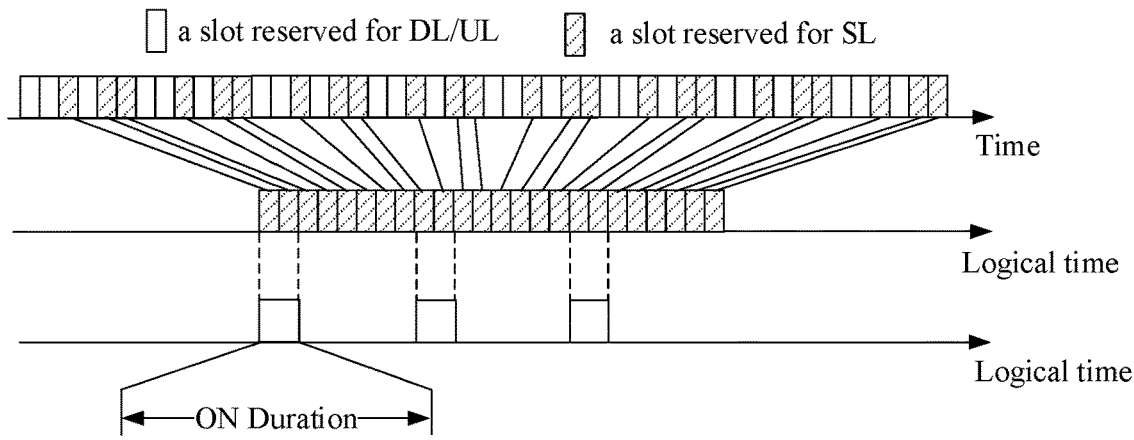
FIG. 8 illustrates another schematic diagram of an on duration according to one embodiment of the present disclosure.

Embodiment 8 illustrates another schematic diagram of an on duration according to one embodiment of the present disclosure, as shown in FIG. 8. In FIG. 8, candidate slots comprised in the on duration are inconsecutive in time domain.

In one embodiment, the on duration comprises a positive integer number of subframe(s), and the subframe(s) is(are) reserved for SL.

In one embodiment, the on duration comprises a positive integer number of slot(s), and the slot(s) is(are) reserved for SL.

In one embodiment, the slots comprised in the on duration are inconsecutive in time domain.

In one embodiment, the slot(s) comprised in the on duration belongs (belong) to a D2D time-frequency resource pool.

In one embodiment, the slot(s) comprised in the on duration belongs (belong) to a V2V time-frequency resource pool.

In one embodiment, the slots comprised in the on duration belong to a same V2V time-frequency resource pool.

In one embodiment, the slots comprised in the on duration are consecutive in logical time domain, and the logical time domain comprises time-domain resources reserved for SL.

In one embodiment, a slot comprises 14 multicarrier symbols.

In one embodiment, a slot comprises 12 multicarrier symbols.

In one embodiment, a slot comprises an SCI search space.

Embodiment 9

Figure 9:
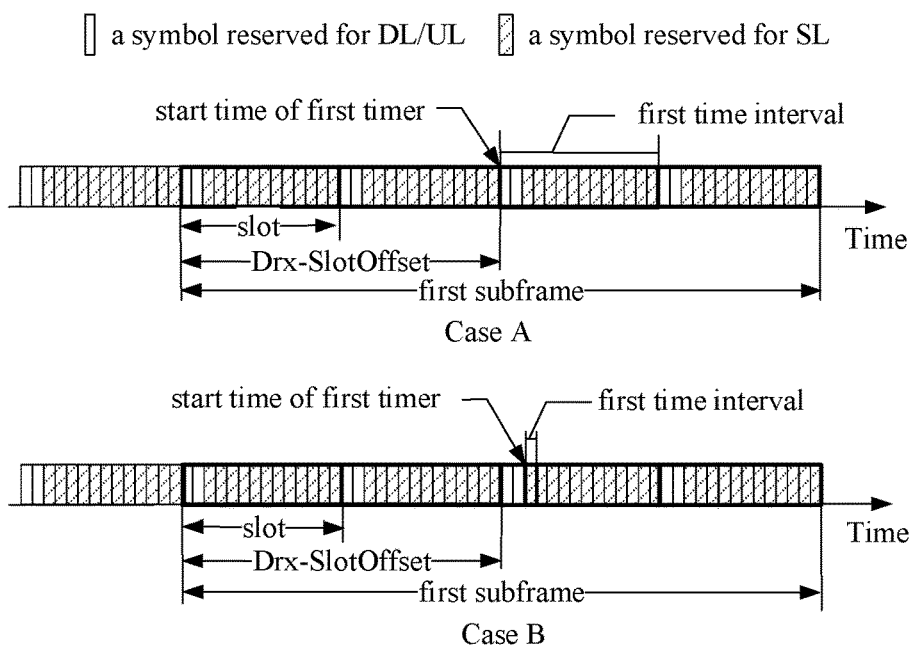
FIG. 9 illustrates a schematic diagram of a first subframe and a first time interval according to one embodiment of the present disclosure.

Embodiment 9 illustrates a schematic diagram of a first subframe and a first time interval according to one embodiment of the present disclosure, as shown in FIG. 9.

In case A of the Embodiment 9, a first time interval is a first slot after a Drx-SlotOffset-th slot in a first subframe, as shown in FIG. 9, a first time interval is a third slot in the first subframe.

In one embodiment, a start time of the third slot in the first subframe is a start time of the first timer.

In case B of the Embodiment 9, a first time interval is a first multicarrier symbol reserved for SL in a first slot after a Drx-SlotOffset-th slot in a first subframe, as shown in FIG. 9, the first time interval is a third multicarrier symbol in a third slot in the first subframe.

In one embodiment, a start time of a third multicarrier symbol in the third slot in the first subframe is a start time of a first timer.

Embodiment 10

Figure 10:
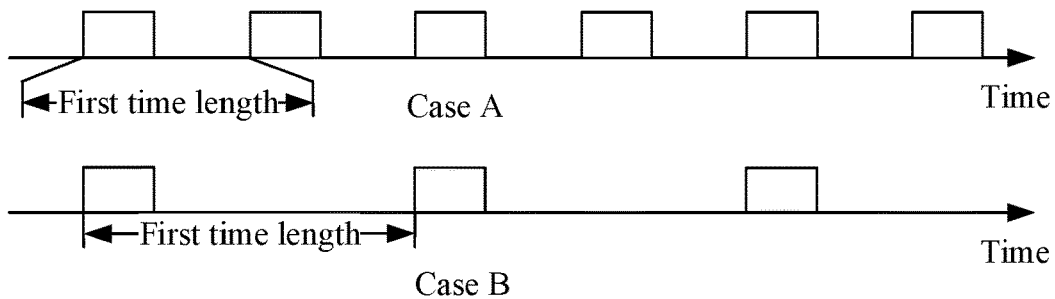
FIG. 10 illustrates a schematic diagram of a drx-ShortCycle and a drx-LongCycle according to one embodiment of the present disclosure.

Embodiment 10 illustrates a schematic diagram of drx-ShortCycle and drx-LongCycle according to one embodiment of the present disclosure, as shown in FIG. 10.

In case A of the Embodiment 10, a first time length is a drx-ShortCycle.

In case B of the Embodiment 10, a first time length is a drx-LongCycle.

In one embodiment, the drx-LongCycle is greater than the drx-ShortCycle.

In one embodiment, the drx-LongCycle is X drx-ShortCycle(s), X being a positive integer.

In one embodiment, when discontinuous reception of the drx-ShortCycle is used, a first time length is a drx-ShortCycle.

In one embodiment, when discontinuous reception of the drx-LongCycle is used, a first time length is a drx-LongCycle.

In one embodiment, a first time length is greater than the on duration in the present disclosure.

Embodiment 11

Figure 11:
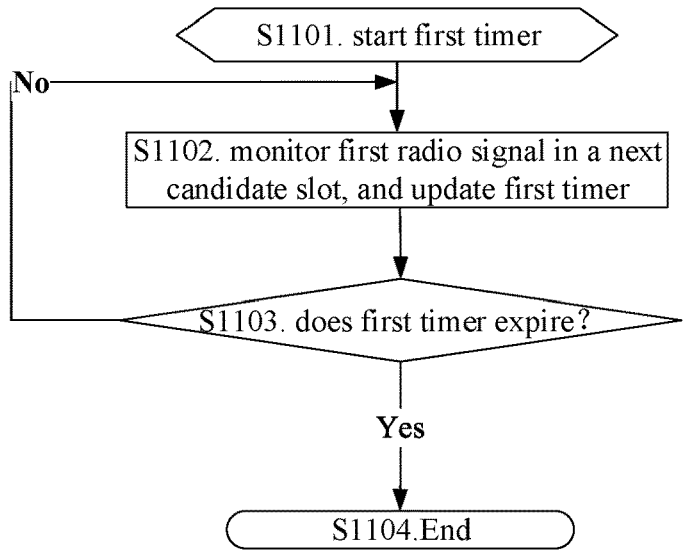
FIG. 11 illustrates a flowchart of utilizing a first timer according to one embodiment of the present disclosure.

Embodiment 11 illustrates a flowchart of utilizing a first timer according to one embodiment of the present disclosure, as shown in FIG. 11. Steps in FIG. 11 are performed in a first node.

A first timer is started in step S1101; in step S1102, a first radio signal is monitored in a next candidate slot, and a first timer is updated; whether a first timer expires is judged in step S1103, if yes, the step ends, if no, returns to step S1102.

In one embodiment, the first timer is maintained on the MAC layer.

In one embodiment, the first timer is maintained by a MAC entity.

In one embodiment, the first timer is a drx-onDuration-Timer.

In one embodiment, the first timer is a drx-onDuration-TimerSL.

In one embodiment, when the first timer is running, the first timer is updated in each second time interval in the present disclosure.

In one embodiment, the second information indicates a configuration parameter of the first timer, and the configuration parameter of the first timer comprises the first expiration value of the first timer.

In one embodiment, the first expiration value of the first timer can be L ms, L being a positive integer, such as the first expiration value can be 5 ms.

In one embodiment, the first expiration value of the first timer can be K, and the K is a positive integer between 1 and 31 (including 1 and 31).

In one embodiment, the first expiration value of the first timer divided by the second time interval is a second expiration value; if the first expiration value of the first timer is 5 ms, the second time interval comprises a slot, a length of the slot is determined as 0.5 ms according to 30K SCS, and the second expiration value is 5/0.5=10.

In one embodiment, an initial value of the first timer is 0, and the phrase of updating the first timer is increasing the first timer's value by 1; when the first timer's value is the second expiration value of the first timer, the first timer is stopped.

In one embodiment, an initial value of the first timer is the second expiration value of the first timer, and the phrase of updating the first timer is decreasing the first timer's value by 1; when the first timer's value is 0, the first timer is stopped.

In one embodiment, each time the candidate slot is passed, the first timer is updated.

In one embodiment, when the first timer is running, the first node is in a on duration, the on duration comprises Q1 the candidate slot(s), Q1 being a positive integer, and the second information indicates the Q1.

In one embodiment, when the first timer is running, the first node is in a continuous reception state.

In one embodiment, when the first timer is running, the first node monitors the first radio signal in all D2D resource pools.

In one embodiment, when the first timer is running, the first node monitors the first radio signal in all V2X resource pools.

In one embodiment, when the first timer is running, the first node monitors DCI in all Downlink slots.

In one embodiment, the next candidate slot is a nearest upcoming candidate slot.

In one embodiment, the next candidate slot is a nearest upcoming slot reserved for V2X.

In one embodiment, the next candidate slot is a nearest upcoming slot reserved for a same V2X resource pool.

Embodiment 12

Figure 12:
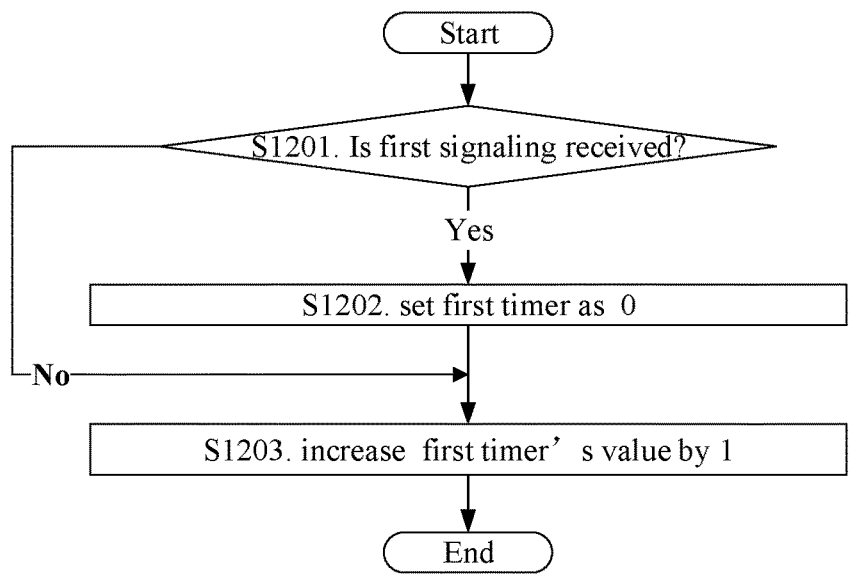
FIG. 12 illustrates a flowchart of updating a first timer according to one embodiment of the present disclosure.

Embodiment 12 illustrates a flowchart of updating a first timer according to one embodiment of the present disclosure, as shown in FIG. 12. Embodiment 12 can be regarded as a specific embodiment of the step S1102 in Embodiment 11.

Whether a first signaling is received is judged in step S1201, if yes, a first timer's value in step S1202 is set as 0, and if no, a first timer's value is increased by 1 in step S1203.

In one embodiment, when the first node receives the first signaling, the first receiver set the first timer's value as 0 and restart the first timer until a next start time of the first time interval in the present disclosure.

Embodiment 13

Figure 13:
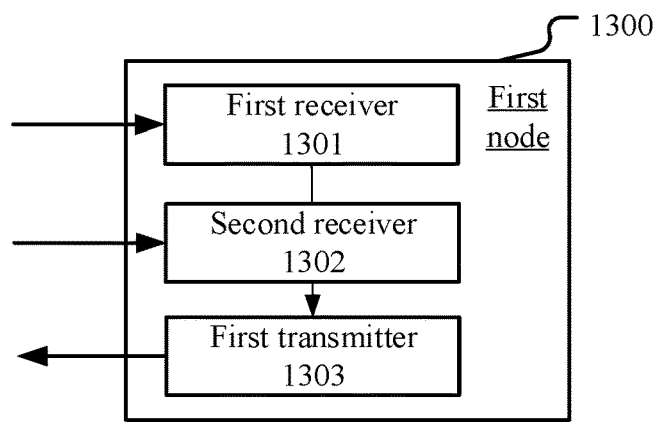
FIG. 13 illustrates a structure block diagram of a processing device in a first node according to one embodiment of the present disclosure.

Embodiment 13 illustrates a structure block diagram of a processing device in a first node according to one embodiment of the present disclosure, as shown in FIG. 13. In FIG. 13, the first node's processing device 1300 comprises a first receiver 1301, a second receiver 1302 and a first transmitter 1303. The first receiver 1301 comprises the transmitter/receiver 456 (including the antenna 460), the receiving processor 452 and the controller/processor 490 in FIG. 4 of the present disclosure; the second receiver 1302 comprises the transmitter/receiver 456 (including the antenna 460), the receiving processor 452 and the controller/processor 490 in FIG. 4 of the present disclosure; the first transmitter 1303 comprises the transmitter/receiver 456 (including the antenna 460), the transmitting processor 455 and the controller/processor 490.

In Embodiment 13, the first receiver 1301 receives first information, and the first information indicates a first ID; determines a start time of a first timer according to the first ID; at the start time of the first timer, starts the first timer; a second receiver 1302, when the first timer is running, monitors a first radio signal in each candidate slot; herein, the first ID belongs to a link-layer ID.

In one embodiment, the start time of the first timer is a start time of a first time interval; a remainder of an index of a first subframe in an FN period divided by a first time length is the same as a remainder of the first ID divided by the first time length; herein, the first subframe comprises the first time interval.

In one embodiment, the second receiver 1302, when the first timer is running, updates the first timer in each second time interval.

In one embodiment, the first receiver 1301 receives second information, and the second information indicates a first expiration value of the first timer.

In one embodiment, the start time of the first timer is a start time of a first time interval; a remainder of an index of a first subframe in an FN period divided by a first time length is the same as a remainder of the first ID divided by the first time length; herein, the first subframe comprises the first time interval; the first time length is a drx-ShortCycle, or a drx-LongCycle.

In one embodiment, the start time of the first timer is a start time of a first time interval; a remainder of an index of a first subframe in an FN period divided by a first time length is the same as a remainder of the first ID divided by the first time length; herein, the first subframe comprises the first time interval; the first receiver 1301 receives third information, and the third information indicates the FN and a subframe number; herein, the FN and the subframe number are used together for determining the index of the first subframe in the FN period.

In one embodiment, the first transmitter 1303, transmits an ID of the first node; herein, the first radio signal is monitored on SL.

In one embodiment, the first receiver 1301, receives a first signaling; herein, the first signaling is a MAC control element used for DRX.

Embodiment 14

Figure 14:
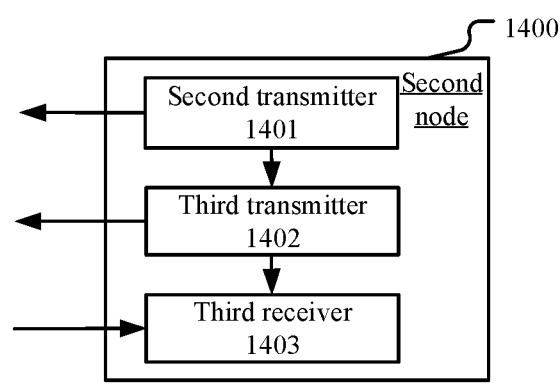
FIG. 14 illustrates a structure block diagram of a processing device in second node according to one embodiment of the present disclosure.

Embodiment 14 illustrates a structure block diagram of a processing device in a second node according to one embodiment of the present disclosure, as shown in FIG. 14. In FIG. 14, a second node's processing device 1400 comprises a second transmitter 1401, a third transmitter 1402 and a third receiver 1403. The second transmitter 1401 comprises the transmitter/receiver 416 (including the antenna 420), the transmitting processor 415 and the controller/processor 440 in FIG. 4 of the present disclosure; the third transmitter 1402 comprises the transmitter/receiver 416 (including the antenna 420), the transmitting processor 415 and the controller/processor 440 in FIG. 4 of the present disclosure; the third receiver 1403 comprises the transmitter/receiver 416 (including the antenna 420), the receiving processor 412 and the controller/processor 440 in FIG. 4 of the present disclosure.

In Embodiment 14, the second transmitter 1401 transmits first information, and the first information comprises a first ID; the first ID is used for indicating a start time of a first timer; at the start time of the first timer, the first timer is started; the third transmitter 1402, when the first timer is running, transmits a first radio signal in a candidate slot; herein, the first ID belongs to a link-layer ID.

In one embodiment, the start time of the first timer is a start time of a first time interval; a remainder of an index of a first subframe in an FN period divided by a first time length is the same as a remainder of the first ID divided by the first time length; herein, the first subframe comprises the first time interval.

In one embodiment, the third transmitter 1402, when the first timer is running, updates the first timer in each second time interval.

In one embodiment, the second transmitter 1401 transmits second information, and the second information comprises a first expiration value of the first timer.

In one embodiment, the start time of the first timer is a start time of a first time interval; a remainder of an index of a first subframe in an FN period divided by a first time length is the same as a remainder of the first ID divided by the first time length; herein, the first subframe comprises the first time interval; the first time length is a drx-ShortCycle, or a drx-LongCycle.

In one embodiment, the start time of the first timer is a start time of a first time interval; a remainder of an index of a first subframe in an FN period divided by a first time length is the same as a remainder of the first ID divided by the first time length; herein, the first subframe comprises the first time interval; the second transmitter 1401 transmits third information, and the third information indicates the FN and a subframe number; herein, the FN and the subframe number are used for indicating the index of the first subframe in the FN period.

In one embodiment, the third receiver 1403 receives an ID of the first node; herein, the first radio signal is transmitted on SL.

In one embodiment, the second transmitter 1401 transmits a first signaling; herein, the first signaling is a MAC control element used for DRX.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first-type communication node or the UE or the terminal in the present disclosure includes but are not limited to mobile phones, tablet computers, laptops, network cards, low-power devices, enhanced Machine Type Communication (eMTC) devices, NB-IOT devices, vehicle-mounted communication equipment, aircrafts, airplanes, unmanned aerial vehicles (UAV), tele-controlled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmission and Reception Points (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, receiving first information, the first information indicating a first identity (ID), the first ID belonging to a link-layer ID; determining a start time of a first timer according to the first ID; at the start time of the first timer, starting the first timer; and
   a second receiver, when the first timer is running, monitoring a first radio signal in each candidate slot;
   wherein the start time of the first timer is a start time of a first time interval; a remainder of an index of a first subframe in an FN (Frame Number) period divided by a first time length is the same as a remainder of the first ID divided by the first time length;
   the first subframe comprises the first time interval.

2. The first node according to claim 1, comprising:
   the second receiver, when the first timer is running, updating the first timer in each second time interval.

3. The first node according to claim 1, comprising:
   the first receiver, receiving second information, the second information indicating a first expiration value of the first timer.

4. The first node according to claim 1, wherein the first time length is a drx-ShortCycle, or a drx-LongCycle.

5. The first node according to claim 1, comprising:
   the first receiver, receiving third information, the third information indicating an FN and a subframe number;
   wherein the FN and the subframe number are used for determining the index of the first subframe in the FN period.

6. The first node according to claim 1, comprising:
   the first receiver, receiving a first signaling;
   wherein the first signaling is a MAC (Medium Access Control) control element used for DRX (Discontinuous Reception).

7. A second node for wireless communications, comprising:
- a second transmitter, transmitting first information, the first information comprising a first identity) ID, the first ID belonging to a link-layer ID; and
- a third transmitter, when a first timer is running, transmitting a first radio signal in a candidate slot;
- wherein the first ID is used for indicating a start time of the first timer; at the start time of the first timer, the first timer is started; the start time of the first timer is a start time of a first time interval; a remainder of an index of a first subframe in an FN (Frame Number) period divided by a first time length is the same as a remainder of the first ID divided by the first time length;
- the first subframe comprises the first time interval.

8. The second node according to claim 7, comprising:
the second transmitter, transmitting second information, the second information comprising a first expiration value of the first timer.

9. The second node according to claim 7, wherein the first time length is a drx-ShortCycle, or a drx-LongCycle.

10. The second node according to claim 7, comprising:
the second transmitter, transmitting third information, and the third information indicating an FN and a subframe number;
wherein the FN and the subframe number are used for indicating the index of the first subframe in the FN period.

11. The second node according to claim 7, comprising:
the second transmitter, transmitting a first signaling;
wherein the first signaling is a MAC (Medium Access Control) control element used for DRX (Discontinuous Reception).

12. A method in a first node for wireless communications, comprising:
receiving first information, the first information indicating a first (identity) ID, the first ID belonging to a link-layer ID; determining a start time of a first timer according to the first ID; at the start time of the first timer, starting the first timer; and
when the first timer is running, monitoring a first radio signal in each candidate slot;
wherein the start time of the first timer is a start time of a first time interval; a remainder of an index of a first subframe in an FN (Frame Number) period divided by a first time length is the same as a remainder of the first ID divided by the first time length;
the first subframe comprises the first time interval.

13. The method in a first node according to claim 12, comprising:
when the first timer is running, updating the first timer in each second time interval.

14. The method in a first node according to claim 12, comprising:
receiving second information, the second information indicating a first expiration value of the first timer.

15. The method in a first node according to claim 12, wherein the first time length is a drx-ShortCycle, or a drx-LongCycle.

16. The method in a first node according to claim 12, comprising:
receiving third information, the third information indicating an FN and a subframe number;
wherein the FN and the subframe number are used for determining the index of the first subframe in the FN period.

17. The method in a first node according to claim 12, comprising:
receiving a first signaling;
wherein the first signaling is a MAC (Medium Access Control) control element used for DRX (Discontinuous Reception).

\* \* \* \* \*